United States Patent
Sakaguchi (10) Patent No.: US 9,284,129 B2
(45) Date of Patent: Mar. 15, 2016

(54) CONVEYOR BELT APPARATUS

(71) Applicant: BRIDGESTONE CORPORATION, Chuo-ku, Tokyo (JP)

(72) Inventor: Toshiki Sakaguchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/361,758

(22) PCT Filed: Nov. 27, 2012

(86) PCT No.: PCT/JP2012/080575
§ 371 (c)(1),
(2) Date: May 30, 2014

(87) PCT Pub. No.: WO2013/080954
PCT Pub. Date: Jun. 6, 2013

(65) Prior Publication Data
US 2014/0326582 A1     Nov. 6, 2014

(30) Foreign Application Priority Data
Dec. 2, 2011     (JP) .................. 2011-264958

(51) Int. Cl.
*B65G 43/02*     (2006.01)
*B65G 43/00*     (2006.01)
*B65G 15/30*     (2006.01)

(52) U.S. Cl.
CPC ............... *B65G 43/00* (2013.01); *B65G 15/30* (2013.01); *B65G 43/02* (2013.01)

(58) Field of Classification Search
CPC ......... B65G 43/02; B65G 43/00; B65G 15/30
See application file for complete search history.

(56) References Cited

U.S. PATENT DOCUMENTS

| | | | | |
|---|---|---|---|---|
| 6,476,110 B1 * | 11/2002 | Papp | .................... | B60C 1/0025 152/525 |
| 7,347,317 B2 * | 3/2008 | Aizawa | .................. | B65G 43/02 198/690.1 |
| 7,748,521 B2 * | 7/2010 | Aizawa | .................. | B65G 43/02 198/810.02 |
| 7,766,157 B2 * | 8/2010 | Nishikita | ............... | B65G 43/02 198/810.02 |
| 8,157,085 B2 * | 4/2012 | Furukawa | .............. | B65G 43/00 198/810.02 |
| 8,330,452 B2 * | 12/2012 | Furukawa | .............. | B65G 43/02 198/444 |

(Continued)

FOREIGN PATENT DOCUMENTS

| | | |
|---|---|---|
| CN | 2223736 Y | 4/1996 |
| CN | 1835881 A | 9/2006 |

(Continued)

OTHER PUBLICATIONS

Communication dated Mar. 19, 2015 from the State Intellectual Property Office of People's Republic of China in counterpart Application No. 201280058865.2.

(Continued)

*Primary Examiner* — Gene Crawford
*Assistant Examiner* — Thomas Randazzo
(74) *Attorney, Agent, or Firm* — Sughrue Mion, PLLC (57) ABSTRACT

A conveyor belt apparatus (10) is provided with a wear measuring device (12) that measures an amount of wear of a surface (11a) of a conveyor belt (11) on which transport material has been loaded, and with a revolution counting device (14) that counts a number of revolutions of the conveyor belt (11).

8 Claims, 4 Drawing Sheets

(56) References Cited

U.S. PATENT DOCUMENTS

| | | | | |
|---|---|---|---|---|
| 8,755,589 | B2* | 6/2014 | Sobczak | G06T 7/0004 198/502.1 |
| 8,991,594 | B2* | 3/2015 | Nakamura | B65G 43/02 198/810.02 |
| 2009/0080607 | A1* | 3/2009 | Hoffmann | A22C 5/00 378/53 |
| 2010/0243410 | A1* | 9/2010 | Hall | B65G 45/22 198/495 |

FOREIGN PATENT DOCUMENTS

| | | |
|---|---|---|
| CN | 101160250 A | 4/2008 |
| GB | 2406843 A | 4/2005 |
| JP | 55123806 A | 9/1980 |
| JP | 56145007 A | 11/1981 |
| JP | 2001-130779 A | 5/2001 |
| JP | 2003-154148 A | 5/2003 |
| JP | 2005-138979 A | 6/2005 |
| JP | 2006-315858 A | 11/2006 |
| JP | 2010-210779 A | 9/2010 |

OTHER PUBLICATIONS

International Search Report for PCT/JP2012/080575 dated Mar. 5, 2013.

* cited by examiner

CONVEYOR BELT APPARATUS

CROSS REFERENCE TO RELATED APPLICATIONS

This application is a National Stage of International Application No. PCT/JP2012/080575 filed Nov. 27, 2012, claiming priority based on Japanese Patent Application No. 2011-264958 filed Dec. 2, 2011, the contents of all of which are incorporated herein by reference in their entirety.

TECHNICAL FIELD

The present invention relates to a conveyor belt apparatus. Priority is claimed on Japanese Patent Application No. 2011-264958, filed Dec. 2, 2011, the contents of which are incorporated herein by reference.

TECHNICAL BACKGROUND

Conventionally, a conveyor belt apparatus such as that shown, for example, in Patent document 1 (see below) is known that is provided with an endless belt-shaped conveyor belt that transports transport material, and with a wear measuring device that measures the amount of wear of the surface of the conveyor belt upon which the transport material is placed.

In this type of conveyor belt apparatus, the amount of wear of the surface of the conveyor belt is measured at regular intervals. The remaining time until the conveyor belt reaches the end of its usable life is then predicted based on this amount of wear, on the length of time that has elapsed from the point when the conveyor belt, which had not been used up until that point, was first used until the point when the aforementioned amount of wear was measured, and on the amount of wear that exists when the conveyor belt reaches the end of its usable life which has been determined in advance.

DOCUMENTS OF THE PRIOR ART

Patent Documents

[Patent document 1] Japanese Unexamined Patent Application, First Publication No. 2005-138979

DISCLOSURE OF THE INVENTION

Problems to be Solved by the Invention

However, in the aforementioned conventional conveyor belt apparatus, for example, when the period of operation of the conveyor belt is not always the same in different periods lasting from when the amount of wear is measured once to when the amount of wear is then measured again so that the amount of the transport material that is transported is not consistent, it is difficult to accurately predict the remaining lifespan of the conveyor belt.

The present invention was conceived in view of the above-described circumstances, and it is an object thereof to provide a conveyor belt apparatus that makes it possible to accurately predict the lifespan of a conveyor belt.

Means for Solving the Problem

In order to solve the above-described problem, the present invention employs the following members.

A conveyor belt apparatus according to a first aspect of the present invention is provided with: an endless belt-shaped conveyor belt that transports transport material; and a wear measuring device that measures an amount of wear of a surface of the conveyor belt on which the transport material has been loaded, wherein there is provided a revolution counting device that counts the number of revolutions of the conveyor belt.

Effects of the Invention

According to the conveyor belt apparatus of the present invention, it is possible to accurately predict the lifespan of a conveyor belt.

BEST EMBODIMENTS FOR IMPLEMENTING THE INVENTION

Hereinafter, a conveyor belt apparatus according to an embodiment of the present invention will be described with reference made to the drawings.

Figure 1:
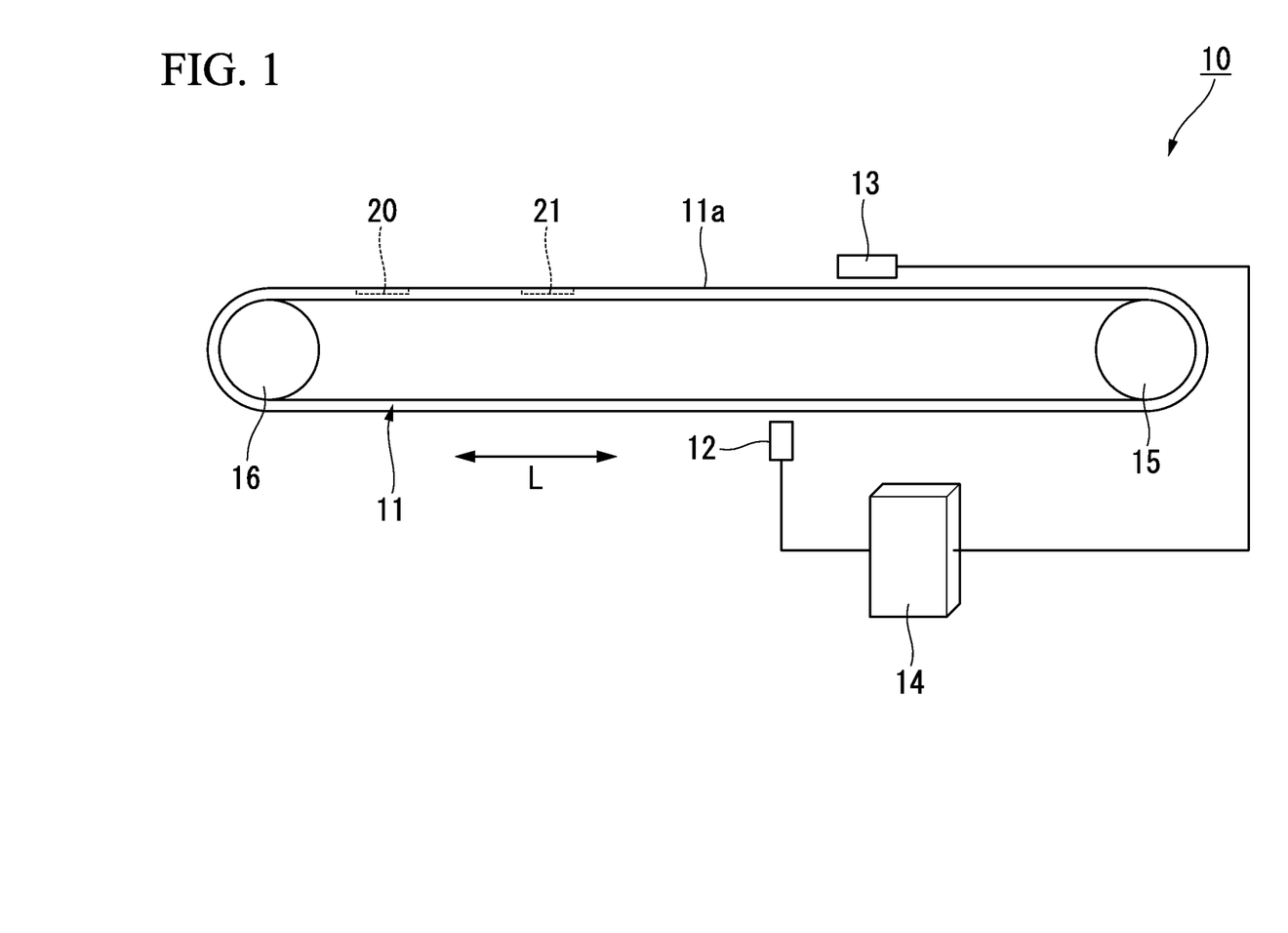
FIG. 1 is a side view showing a conveyor belt apparatus according to an embodiment of the present invention.
Figure 2:
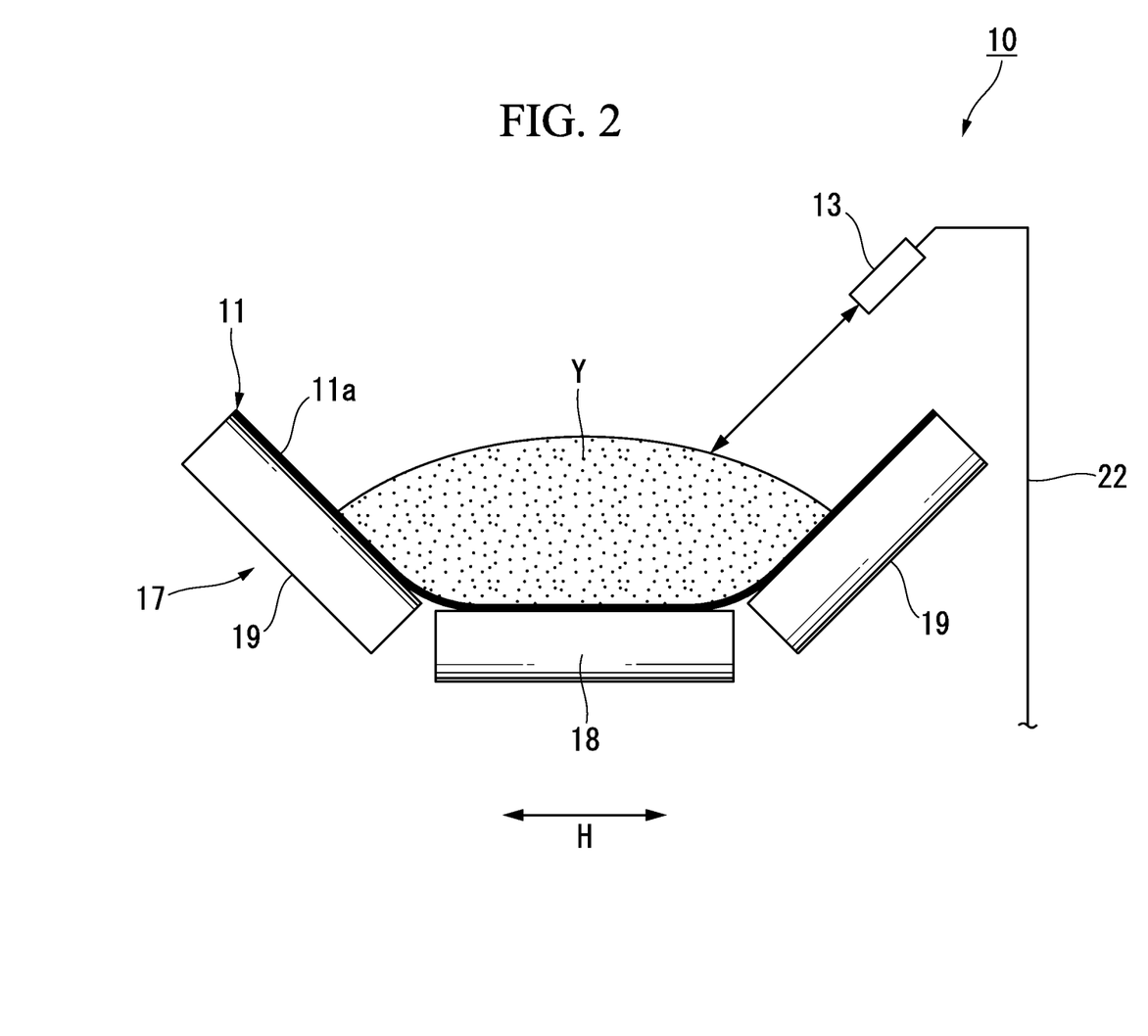
FIG. 2 is a partial vertical cross-sectional view of principal portions making up the conveyor belt apparatus shown in FIG. 1.

As is shown in FIG. 1 and FIG. 2, a conveyor belt apparatus 10 is provided with an endless belt-shaped conveyor belt 11 that transports transport material Y, a wear measuring device 12 (i.e., a revolution detecting device) that measures the amount of wear of a surface 11a of the conveyor belt 11 on which the transport material Y is placed, a load height measuring device 13 that measures the load height of the transport material Y that has been loaded onto the conveyor belt 11, and a calculating section (i.e., a revolution counting device) 14 that separately acquires measurement data from the wear measuring device 12 and the load height measuring device 13.

The conveyor belt 11 is entrained between a pair of pulleys 15 and 16 that are placed a predetermined distance apart in a horizontal direction and that are able to rotate around their own axis of rotation. In the example shown in the drawings, a drive pulley 15 and a slave pulley 16 are provided as the pair of pulleys 15 and 16. The rotation axes of these two pulleys 15 and 16 are parallel to each other, and extend in a belt transverse direction H.

The conveyor belt 11 is supported on a carrier side thereof, which is the side where the surface 11a faces upwards in a vertical direction, by a plurality of belt supporting means 17 that are lined up in a belt circumferential direction L between the drive roller 15 and the slave roller 16. The conveyor belt 11 on the carrier side travels while being supported in the shape of a trough by the belt supporting means 17. The belt supporting means 17 are provided such that they are able to rotate freely around their axis of rotation which extends in the belt transverse direction H. The belt supporting means 17 are provided with a center roller 18 that supports a central portion in the belt transverse direction H of the conveyor belt 11, and with a pair of side rollers 19. The pair of side rollers 19 are placed on the two outer sides in the belt transverse direction H of the center roller 18, and are provided such that they are able to rotate freely around their axes of rotation which are inclined relative to the axis of rotation of the center roller 18. The pair of side rollers 19 individually support side end portions in the belt transverse direction H of the conveyor belt 11.

The carrier side of the conveyor belt 11 transports the transport material Y that has been placed on top of the conveyor belt 11 from the slave pulley 16 (i.e., the one pulley) side towards the drive pulley 15 (i.e., the other pulley) side. A hopper (not shown) that drops the transport material Y onto the conveyor belt 11 is provided above the carrier side of the conveyor belt 11. The carrier side of the conveyor belt 11 transports the transport material Y that has been dropped from the hopper to an unloading portion (not shown) that is provided on the drive pulley 15 side.

In the example shown in the drawings, a return side of the conveyor belt 11, which is the side where the surface 11a faces downwards in a vertical direction, travels while being opened out into a flat state in the belt transverse direction H.

A first magnetic field generating device 20 and a second magnetic field generating device 21 that emit magnetic fields towards the surface 11a side of the conveyor belt 11 are provided separately in the conveyor belt 11. The first magnetic field generating device 20 and the second magnetic field generating device 21 are provided at mutually different positions in the belt circumferential direction L, and at the same position as each other in the belt transverse direction H.

The polarities of the respective magnetic fields generated by the first magnetic field generating device 20 and the second magnetic field generating device 21 are mutually different from each other on the surface 11a side of the conveyor belt 11. The respective magnetic field generating devices 20 and 21 are each formed by a single rubber magnet that has sufficient flexibility to allow it to be deformed as it follows the revolving of the conveyor belt 11. The respective magnetic fields of the rubber magnet forming the first magnetic field generating device 20 and the rubber magnet forming the second magnetic field generating device 21 have mutually different polarities on the surface 11a side of the conveyor belt 11. The rubber magnets are formed by bonded magnetic bodies that may be created, for example, by dispersing magnetic powder of a permanent magnetic material in a rubber compound, and are magnetized in the thickness direction of the conveyor belt 11. Rare earth magnets such as neodymium-iron-boron or samarium-iron-boron-based magnets, alnico magnets, and ferrite and the like can be employed for the magnetic powder.

The first magnetic field generating device 20 is embedded, for example, in the conveyor belt 11 such that it is exposed at the surface 11a of the conveyor belt 11. As the surface 11a of the conveyor belt 11 is worn down, the first magnetic field generating device 20 is also worn down. As the surface 11a of the conveyor belt 11 is worn down, for example, the size of the magnetic field of the first magnetic field generating device 20, the range in the belt transverse direction H of the magnetic field of the first magnetic field generating device 20, and the range in the belt circumferential direction L of the magnetic field of the first magnetic field generating device 20 all change.

The wear measuring device 12 measures the amount of wear of the surface of the conveyor belt using the condition of the conveyor belt 11 when it was first put to use as a reference point. The wear measuring device 12 is formed by a magnetic sensor that measures the magnetic field of the first magnetic field generating device 20, which, as is described above, changes in accordance with the amount of wear of the surface 11a of the conveyor belt 11, and uses this measurement as the amount of wear of the surface 11a of the conveyor belt 11. For example, a gauss meter or loop coil or the like can be employed for the magnetic sensor.

The wear measuring device 12 is placed so as to face the surface 11a of the conveyor belt 11 that is located on the return side. Note that it is also possible for a transverse direction guide (not shown) that regulates the movement of the conveyor belt 11 in the belt transverse direction H to be provided in a facing portion, that faces the wear measuring device 12, of the belt path along which the conveyor belt 11 passes on the return side. Moreover, it is also possible for a thickness direction guide to be provided in the aforementioned facing portion of the belt path. This thickness direction guide supports the conveyor belt 11 from the rear surface side thereof, and restricts the movement of the conveyor belt 11 away from the wear measuring device 12 in the thickness direction of the conveyor belt 11.

The wear measuring device 12 detects the start and finish of each revolution of the conveyor belt 11. In the example shown in the drawings, the wear measuring device 12 detects the magnetic field of the second magnetic field generating device 21, and uses this as the start and finish of one revolution of the conveyor belt 11. According to the wear measuring device 12, when the end of one revolution of the conveyor belt 11 is detected, the start of the next revolution of the conveyor belt 11 is detected.

The load height measuring device 13 measures the load height of the transport material Y that has been loaded onto a portion of the conveyor belt 11. The load height measuring device 13 is positioned in a measuring section of the belt path of the carrier side of the conveyor belt 11, and this measuring section is located on the drive pulley 15 side of the hopper. The load height measuring device 13 measures the load height of the transport material Y that has been loaded onto the portion of the conveyor belt 11 that is traveling past the aforementioned measuring section.

The load height measuring device 13 is placed on the surface 11a side of the conveyor belt 11. The load height measuring device 13 is formed by a distance sensor that measures the distance from the load height measuring device 13 to the transport material Y by, for example, emitting light such as laser light or ultrasonic waves and then receiving reflections of the light or ultrasonic waves, and uses the measured distance as the load height of the transport material Y.

The load height measuring device 13 is placed higher than both the conveyor belt 11 and the belt supporting means 17, and emits the light or ultrasonic waves towards the transport material Y that has been loaded onto the conveyor belt 11. In the example shown in the drawings, the load height measuring device 13 is held by a bracket 22 such that, when the transport material Y is not loaded onto the surface 11a of the conveyor belt 11, the load height measuring device 13 is able to emit the light or ultrasonic waves towards the center in the belt transverse direction H of the surface 11a of the conveyor belt 11. The load height measuring device 13 is positioned on the outer side in the belt transverse direction H of the central portion in the belt transverse direction H of the conveyor belt 11. The load height measuring device 13 emits the light or ultrasonic waves diagonally downwards towards the inner side in the belt transverse direction H.

Note that the distance from the load height measuring device 13 to the transport material Y is proportionally shorter when the load height of the transport material Y that has been loaded onto the conveyor belt 11 is higher, and is proportionally longer when this load height is lower. Namely, the distance from the load height measuring device 13 to the transport material Y changes in accordance with the load height.

The calculating section 14 counts the number of revolutions of the conveyor belt 11 from the time when the conveyor belt 11 was first put to use. Each time the conveyor belt 11 completes one revolution, the calculating section 14 adds one revolution to the number of revolutions of the conveyor belt 11 based on the detection data for the starting and finishing of each revolution of the conveyor belt 11 that it receives from the wear measuring device 12. As a result, the calculating section 14 counts the aforementioned number of revolutions.

The calculating section 14 determines whether or not the transport material Y is present on the conveyor belt 11 based on measurement data received from the load height measuring device 13. Whether or not the transport material Y is present on the conveyor belt 11 can be determined by comparing the load height of the transport material Y with the size of a reference value that has been determined in advance. If the calculating section 14 determines that no transport material Y is present on the conveyor belt 11 from the start of a revolution of the conveyor belt 11 until the end of that revolution, then the calculating section 14 does not add one revolution to the number of revolutions of the conveyor belt 11.

The calculating section 14 calculates the remaining thickness of the conveyor belt 11 based on measurement data for the amount of wear of the conveyor belt 11 that it has acquired from the wear measuring device 12.

The remaining thickness of the conveyor belt 11 is calculated by subtracting the amount of wear of the conveyor belt 11 from the thickness of the conveyor belt 11 at the point when it was first put to use that has been stored in advance in the calculating section 14.

Figure 3:
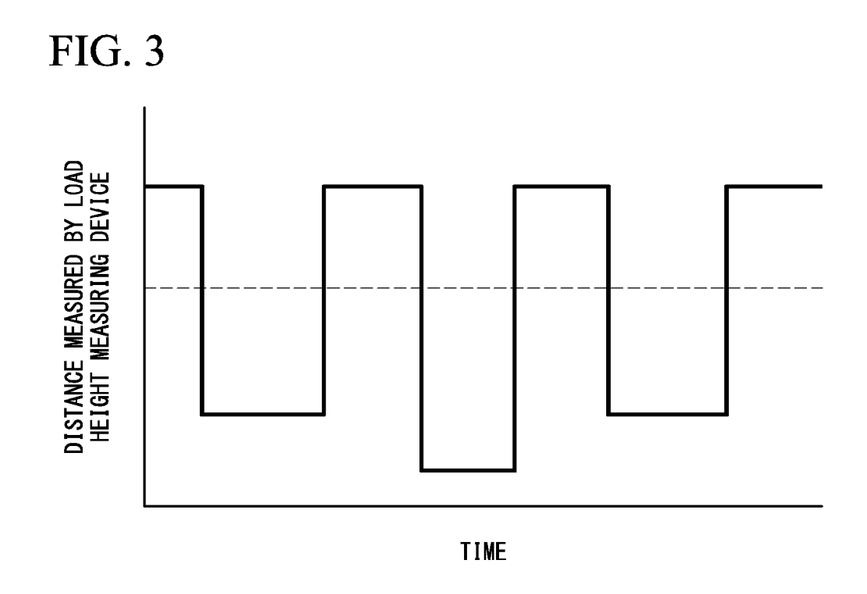
FIG. 3 is a graph illustrating an action of the conveyor belt apparatus shown in FIG. 1.

In the conveyor belt apparatus 10 that is constructed in the manner described above, the conveyor belt 11 is made to travel by the drive pulley 15. At this time, the calculating section 14 counts the number of revolutions of the conveyor belt 11, and also, as is shown in FIG. 3, acquires measurement data from the load height measuring device 13. Each time the conveyor belt 11 completes a fixed number of revolutions, for example, 1000 revolutions or the like, the calculating section 14 acquires measurement data from the wear measuring device 12, and measures the amount of wear by means of this wear measuring device 12.

Figure 4:
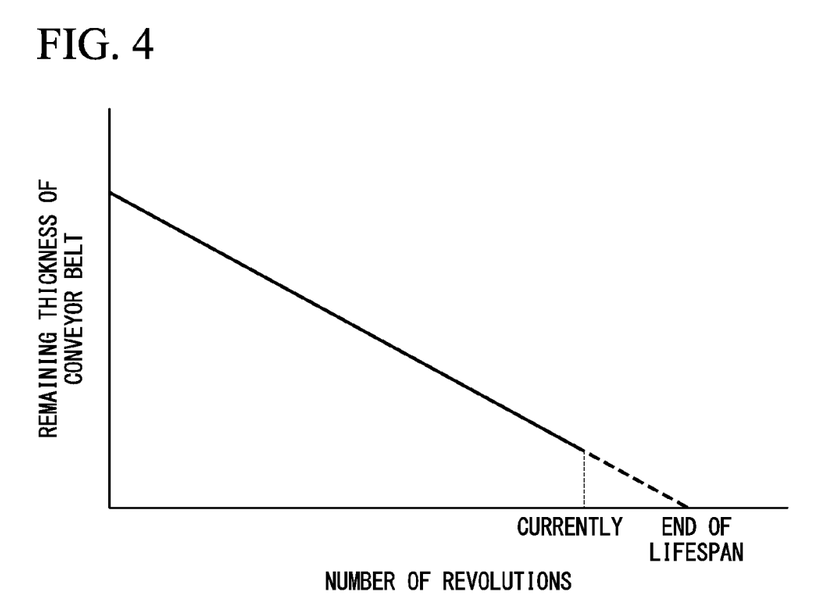
FIG. 4 is a graph illustrating an action of the conveyor belt apparatus shown in FIG. 1.

As has been described above, according to the conveyor belt apparatus 10 of the present embodiment, the calculating section 14 counts the number of revolutions of the conveyor belt 11. Accordingly, when the amount of wear of the surface 11a of the conveyor belt 11 is being measured by the wear measuring device 12, the number of revolutions of the conveyor belt 11 is also counted by the calculating section 14. As a result of this, as is shown in FIG. 4, it is possible to predict the number of remaining revolutions until the conveyor belt 11 reaches the end of its life span based on the aforementioned amount of wear and number of revolutions and on the amount of wear of the conveyor belt 11 when it has reached the end of its life span which has been previously measured. Namely, the lifespan of the conveyor belt 11 can be predicted not based on time, but on the number of revolutions. As a result, it is possible to accurately predict the lifespan of the conveyor belt 11 in any particular period between when the amount of wear is measured once and when the amount of wear is measured again, even if the operating time of the conveyor belt 11 is different in each of these periods.

Note that the vertical axis in the graph shown in FIG. 4 shows the remaining thickness of the conveyor belt 11.

Moreover, if the calculating section 14 determines that no transport material Y is present on the conveyor belt 11 from the start of a revolution of the conveyor belt 11 until the end of that revolution, then the calculating section 14 does not add one revolution to the number of revolutions of the conveyor belt 11. By doing this, it is possible to eliminate revolutions that have no effect on the wear on the surface 11a of the conveyor belt 11 from the number of revolutions of the conveyor belt 11. As a result, the lifespan of the conveyor belt 11 can be predicted even more accurately.

Furthermore, each time the conveyor belt 11 completes one revolution, the calculating section 14 adds one revolution to the number of revolutions of the conveyor belt 11 based on the detection data that the calculating section 14 receives from the wear measuring device 12. As a result, the calculating section 14 counts the number of revolutions of the conveyor belt 11. Accordingly, the number of revolutions made by the conveyor belt 11 can be accurately counted. As a result, the lifespan of the conveyor belt 11 can be predicted even more accurately.

Furthermore, the respective magnetic fields of the first magnetic field generating device 20 and the second magnetic field generating device 21 have mutually different polarities on the surface 11a side of the conveyor belt 11. Because of this, it is possible to determine which magnetic field out of the magnetic fields of the first magnetic field generating device 20 and the second magnetic field generating device 21 has been detected by means of the polarity of the magnetic field that is detected by the wear measuring device 12. As a result of this, the number of revolutions made by the conveyor belt 11 can be predicted even more accurately.

Furthermore, the wear measuring device 12 also functions as the aforementioned revolution detecting device that detects the start and finish of a revolution of the conveyor belt 11. Because of this, it is possible to limit any increase in the size of the conveyor belt apparatus 10 while still being able to detect the start and finish of a revolution of the conveyor belt 11.

Furthermore, the load height measuring device 13 is formed by the aforementioned distance sensor. Because of this, it is possible to measure the load height without having to make contact with the transport material Y. As a result of this, the conveyor belt 11 can be operated stably.

Note that the range of technology of the present invention is not limited to the above-described embodiment, and various modifications and the like may be made insofar as they do not depart from the scope of the present invention.

Figure 5:
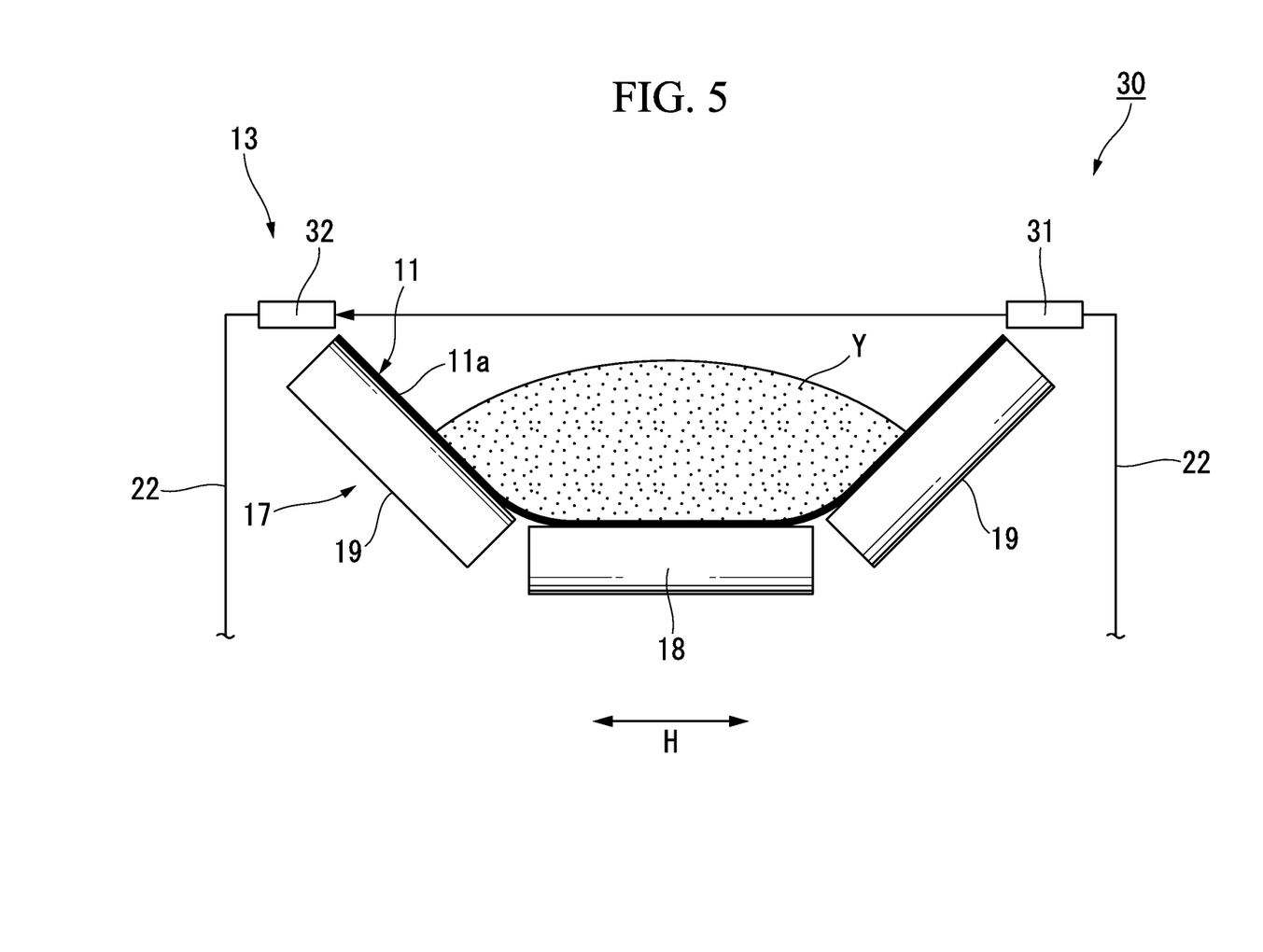
FIG. 5 is a partial vertical cross-sectional view showing a conveyor belt apparatus according to a variant example of the present invention.

For example, in the above-described embodiment, the load height measuring device 13 is formed by the aforementioned distance sensor. However, the present invention is not limited to this. The load height measuring device 13 can also be suitably modified to some other structure that is able to measure the load height of the transport material Y that has been loaded onto the conveyor belt 11. For example, as in the case of a conveyor belt apparatus 30 that is shown in FIG. 5, the load height measuring device 13 is provided with an emitting portion 31 and a receiving portion 32 for either light or ultrasonic waves. The emitting portion 31 and the receiving portion 32 are located above the conveyor belt 11 so as to sandwich the conveyor belt 11 from both sides in the belt transverse direction H. The load height of the transport material Y may be measured based on whether or not light or ultrasonic waves are received by the receiving portion 32.

In the above-described embodiment, if the calculating section 14 determines that no transport material Y is present on the conveyor belt 11 from the start of a revolution of the conveyor belt 11 until the end of that revolution, then the calculating section 14 does not add one revolution to the number of revolutions of the conveyor belt 11. However, the present invention is not limited to this. In such cases, the load height measuring device 13 does not need to be provided.

In the above-described embodiment, the respective magnetic fields of the rubber magnet forming the first magnetic field generating device 20 and the rubber magnet forming the second magnetic field generating device 21 have mutually different polarities on the surface 11a side of the conveyor belt 11. Because of this, the polarities of the respective magnetic fields of the first magnetic field generating device 20 and the second magnetic field generating device 21 are mutually different on the surface 11a side of the conveyor belt 11. However, the present invention is not limited to this. For example, it is also possible for the first magnetic field generating device 20 to be formed by a first rubber magnet, and for the second magnetic field generating device 21 to be formed from two rubber magnets, and for the respective magnetic fields of these two rubber magnets to have mutually different polarities on the surface 11a side of the conveyor belt 11. In this case, the magnetic field emitted by the first magnetic field generating device 20 has one polarity, while the magnetic fields emitted by the second magnetic field generating device 21 have two polarities. Namely, the polarities of the respective magnetic fields of the first magnetic field generating device 20 and the second magnetic field generating device 21 are mutually different.

The polarities of the respective magnetic fields of the first magnetic field generating device 20 and the second magnetic field generating device 21 are mutually different on the surface 11a side of the conveyor belt 11. However, the present invention is not limited to this.

In the above-described embodiment, the wear measuring device 12 detects the start and the finish of each revolution of the conveyor belt 11. However, the present invention is not limited to this. It is also possible for a revolution detecting device to be provided separately from the wear measuring device 12, and for this revolution detecting device to be used to detect the start and finish of each revolution of the conveyor belt 11.

In the above-described embodiment, the wear measuring device 12 is formed by a magnetic sensor that measures the magnetic field of the first magnetic field generating device 20 as the amount of wear of the conveyor belt 11. However, the present invention is not limited to this. The structure that is employed may be suitably altered provided that the structure is able to measure the amount of wear of the surface 11a of the conveyor belt 11.

In the above-described embodiment, the wear measuring device 12 detects the magnetic field of the second magnetic field generating device 21 as the start and finish of one revolution of the conveyor belt 11. However, the present invention is not limited to this. For example, it is also possible for an RFID tag to be provided in the conveyor belt 11 instead of the second magnetic field generating device 21, and for the start and finish of each revolution of the conveyor belt 11 to be detected by detecting this RFID tag.

In the above-described embodiment, the calculating section 14 counts the number of revolutions of the conveyor belt 11 based on detection data for the start and finish of each revolution of the conveyor belt 11 that the calculating section 14 has acquired from the wear measuring device 12. However, the present invention is not limited to this. For example, it is also possible to provide a rotation counting device that counts the number of rotations of the drive pulley 15, and to count the number of revolutions of the conveyor belt 11 based on count data from the rotation counting device.

In the above-described embodiment, the calculating section 14 that acquires measurement data from the wear measuring device 12 also counts the number of revolutions of the conveyor belt 11. However, the present invention is not limited to this. It is also possible to provide a revolution counting device separately from the calculating device 14, and to use the revolution counting device to count the number of revolutions of the conveyor belt 11.

In the above-described embodiment, the carrier side of the conveyor belt 11 travels while being supported in the shape of a trough, and the return side of the conveyor belt 11 travels while being opened out into a flat state in the belt horizontal direction H. However, the present invention is not limited to this.

For example, it is also possible to employ a structure in which the carrier side of the conveyor belt 11 is not supported in the shape of a trough, but instead travels in a flat state over the entire circumference of the conveyor belt 11.

Moreover, it is also possible to employ a structure in which at least one of the carrier side of the conveyor belt 11 and the return side of the conveyor belt 11 travels in the form of a pipe-shaped portion that has been rounded around a pipe axis that extends in the belt circumferential direction L. Out of the carrier side and the return side, if the carrier side of the conveyor belt 11 travels while being rounded into a pipe shape, then the load height measuring device 13 can be placed, for example, in front of or behind the pipe-shaped portion of the carrier side of the conveyor belt 11.

In addition to those described above, the component elements of the above-described embodiment can be replaced, where this is appropriate, with other known component elements. Furthermore, the above-described variant examples can also be used in various appropriate combinations.

INDUSTRIAL APPLICABILITY

According to the present invention, it is possible to obtain a conveyor belt apparatus that makes it possible to predict the lifespan of a conveyor belt with a high degree of accuracy.

DESCRIPTION OF THE REFERENCE NUMERALS 10, 30 . . . Conveyor belt apparatus
11 . . . Conveyor belt
11a . . . Surface
12 . . . Wear measuring device
14 . . . Calculating section (Revolution counting section)
20 . . . First magnetic field generating device
21 . . . Second magnetic field generating device

What is claimed is:

1. A conveyor belt apparatus comprising:
an endless belt-shaped conveyor belt that transports transport material;
a wear measuring device that measures an amount of wear of a surface of the conveyor belt on which the transport material has been loaded;
a revolution counting device that counts a number of revolutions of the conveyor belt; and
a revolution detecting device that detects a start and a finish of each revolution of the conveyor belt,
wherein the wear measuring device is formed by a magnetic sensor that measures as the amount of wear a magnetic field of a first magnetic field generating device that has been installed on the conveyor belt,
the revolution detecting device detects as the start and finish of one revolution of the conveyor belt a magnetic field of a second magnetic field generating device that is installed on the conveyor belt, the wear measuring device also functions as the revolution detecting device, and the revolution counting device counts the number of revolutions by adding one revolution to the number of revolutions made by the conveyor belt each time one revolution has finished based on detection data from the revolution detecting device.

2. The conveyor belt apparatus according to claim 1, wherein the second magnetic field generating device is embedded in the conveyor belt.

3. The conveyor belt apparatus according to claim 1, further comprising:

a load height measuring device that measures a load height of a transport material that has been loaded onto the conveyor belt, wherein the wear measuring device is configured to determine whether or not the transport material is present on the conveyor belt based on measurement data received from the load height measuring device, and the wear measuring device is configured not to add one revolution to the number of revolutions of the conveyor belt when the wear measuring device determines that no transport material is present on the conveyor belt from the start of a revolution of the conveyor belt until the end of that revolution.

4. The conveyor belt apparatus according to claim 1, wherein the polarities of the respective magnetic fields of the first magnetic field generating device and the second magnetic field generating device are mutually different on the surface side of the conveyor belt.

5. The conveyor belt apparatus according to claim 4, wherein the first magnetic field generating device is formed by a single rubber magnet, and the second magnetic field generating device is formed by a single rubber magnet.

6. The conveyor belt apparatus according to claim 4, wherein the first magnetic field generating device is formed by a single rubber magnet, and the second magnetic field generating device is formed by two rubber magnets.

7. The conveyor belt apparatus according to claim 6, wherein magnetic fields of the two rubber magnets which form the second magnetic field generating device have different polarities.

8. The conveyor belt apparatus according to claim 6, wherein magnetic fields of the two rubber magnets which form the second magnetic field generating device have the same polarity.

* * * * *